Figure 1:
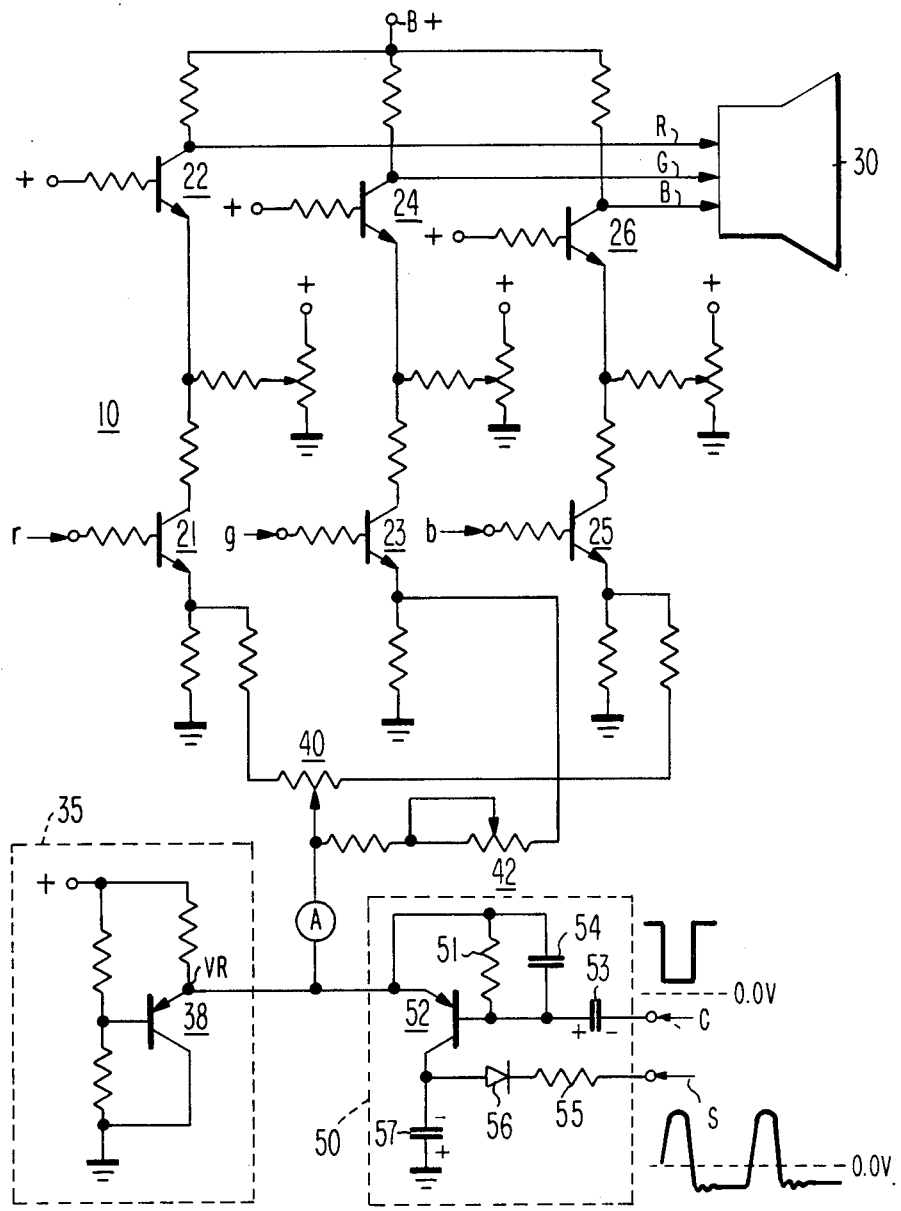

United States Patent [19]
Bell

[11] Patent Number: 4,622,589
[45] Date of Patent: Nov. 11, 1986

[54] TELEVISION RECEIVER ON-SCREEN CHARACTER DISPLAY

[75] Inventor: Isaac M. Bell, Indianapolis, Ind.

[73] Assignee: RCA Corporation, Princeton, N.J.

[21] Appl. No.: 723,149

[22] Filed: Apr. 15, 1985

[51] Int. Cl.⁴ .......................................... H04N 5/262
[52] U.S. Cl. ..................................... 358/183; 358/22
[58] Field of Search .................................. 358/22, 183

[56] References Cited

U.S. PATENT DOCUMENTS 4,354,202 10/1982 Harlan .................................. 358/183
4,435,729 3/1984 Harwood et al. .................... 358/183

FOREIGN PATENT DOCUMENTS 8977 1/1981 Japan ...................................... 358/22

Primary Examiner—John W. Shepperd
Attorney, Agent, or Firm—P. J. Rasmussen; P. M. Emanuel; R. H. Kurdyla

[57] ABSTRACT

In a television receiver with a kinescope driver stage for providing video drive signals to an image displaying kinescope, a control circuit couples an auxiliary character information signal to a reference input of the driver stage, separate from a source of reference bias potential also coupled to the reference input of the driver stage. The intensity of displayed character information is related to the control circuit biasing, which is derived from a pre-existing local source of alternating current signal.

9 Claims, 2 Drawing Figures

TELEVISION RECEIVER ON-SCREEN CHARACTER DISPLAY

This invenition concerns apparatus for applying auxiliary character information signals to television receiver circuits for enabling character information to be displayed on the screen of an image reproducing kinescope.

Many color television receivers include provision for electronic on-screen kinescope display (OSD) of channel numbers so that a viewer can readily verify to which channel the receiver is tuned. Such displays are typically generated by replacing normal video information with appropriately synchronized character signals developed by an alphanumeric character generator in the receiver, so that the character information is displayed on a given portion of the kinescope screen. The information displayed can include time of day information as well as channel information, for example, by employing appropriate electronic control circuits in the receiver. Examples of on-screen character display systems are found in U.S. Pat. No. 3,984,828—Beyers and in U.S. Pat. No. 4,354,202—Harlan.

The Harlan OSD system operates in conjunction with an active reference voltage source which provides a reference voltage to the kinescope driver amplifier stage. The reference voltage is a voltage to which video signals normally amplified by the driver stage are referenced for the purpose of establishing a desired picture black level reference. The reference voltage is modified in a white-going direction during OSD intervals when normal video information is blanked, so that white character information is displayed.

The Harlan OSD system is advantageous in that character display is enabled independent of the normal video signal processing path. Thus the intensity of displayed character information is consistent from one receiver to another, and the intensity is independent of the setting of viewer adjustable brightness and contrast controls normally associated with the video signal processing path. In addition, the amount of high level interference signal components with frequencies within the band of video frequencies generated as a result of electronic switching associated with the character display is insignificant.

In many instances it is desireable to provide displayed character information of high intensity, or "brightness". In the Harlan system this can be accomplished by altering the level of a character timing signal which causes the reference voltage source to produce the modified, white-going reference voltage during OSD intervals. It may also be possible to accomplish this result by modifying the internal biasing of the reference voltage source itself. However, it is recognized that these alternatives may be impractical to implement. For example, it may be difficult or costly to provide a special internal biasing arrangement for the reference voltage source itself to provide both the necessary black level reference voltage for the driver stage during normal video intervals, and a suitable white-going reference voltage for a high intensity character display during OSD intervals. In any case, not all television receivers employ an active reference voltage source of the type utilized by Harlan.

In accordance with the present invention there is disclosed herein an on-screen display control circuit coupled to a reference input of a display driver stage, separate from a source of reference voltage also coupled to the reference input. A high intensity character display is a function of the control circuit biasing, which in a disclosed embodiment is derived from a pre-existing source of locally generated alternating current signals.

Figure 2:
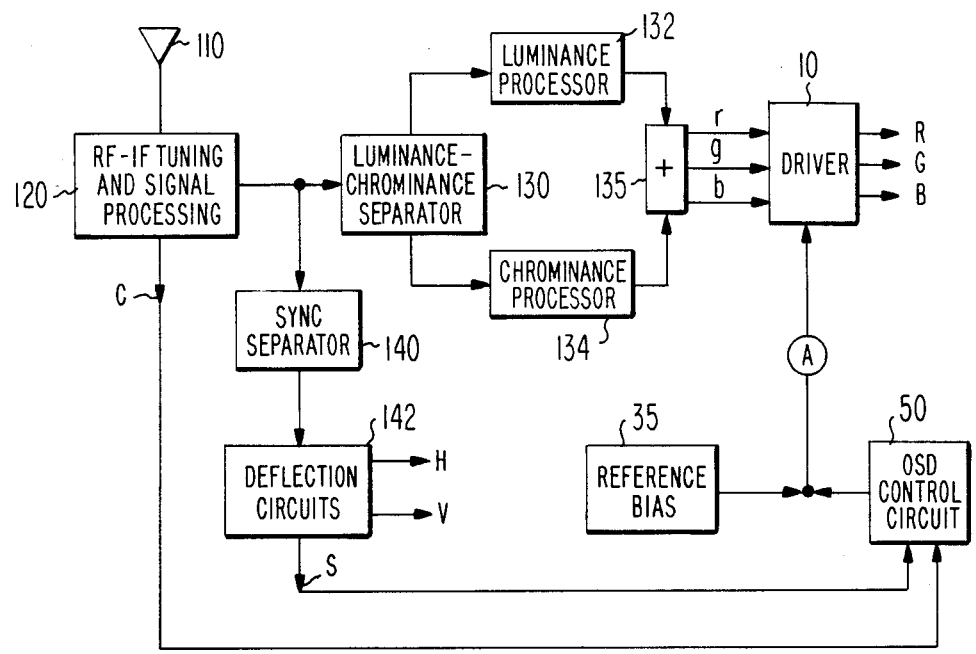

In the drawing:

FIG. 1 shows a portion of a color television receiver including an on-screen display control circuit in accordance with the principles of the present invention; and FIG. 2 shows additional aspects of the color television receiver incorporating the control circuit of FIG. 1.

In FIG. 1, a kinescope driver stage 10 comprises red, green and blue signal amplifiers respectively including transistor pairs 21 and 22, 23 and 24, and 25 and 26, each pair being arranged in a cascode amplifier configuration. Low level r, g and b color image representative video signals are applied individually to base inputs of transistors 21, 23 and 25 for developing high level R, G and B video output signals at collector outputs of transistors 22, 24 and 26. The video output signals are applied to respective intensity control electrodes (e.g., cathode electrodes) of a color image displaying kinescope 30.

Operatively associated with driver stage 10 is a bias network 35 connected in common with each of the red, green and blue signal amplfiers of driver stage 10. Network 35 includes a PNP voltage follower transistor 38 biased to provide a prescribed positive bias reference voltage VR at the emitter output of transistor 38 for normal video signal processing purposes. Reference voltage VR is coupled in common to the emitter circuits of transistors 21, 23 and 25 via a terminal A and variable gain adjustment resistors 40 and 42. Terminal A represents a reference bias input of driver stage 10.

Voltage VR represents a reference potential to which the video signals normally amplified by driver stage 10 are referenced for the purpose of establishing a desired picture black level reference. Specifically, the value of voltage VR (e.g., approximately +3.2 volts) is such that substantially no signal currents flow in the color signal amplifiers of driver 10, and kinescope 30 is biased at a desired threshold conduction point, both when the input color signals to driver stage 10 exhibit a black picture condition and when video signals are absent. In practice, the gain of the kinescope driver stage is established during initial receiver set-up (and periodically during the life of the receiver) by adjusting gain control resistors 40 and 42 in a service operating mode of the receiver when video signals are decoupled from the driver stage and kinescope.

On-screen kinescope display of character information is achieved by modifying the magnitude of reference voltage VR at terminal A. This is accomplished in accordance with the principles of the present invention by means of a control circuit 50 including a keyed PNP transistor 52.

A negative-going character information signal C, appropriately synchronized with the horizontal and vertical image scanning signals, is applied to a base input of transitor 52 via an AC coupling capacitor 53, the emitter output of transistor 52 being coupled to reference terminal A. Collector DC bias for transistor 52 is derived from a locally generated alternating current signal S by means of a circuit including a resistor 55, a rectifier diode 56 and a filter capacitor 57 coupled to the collector of transitor 52. In this example signal S is derived from horizontal deflection circuits of the receiver, and in particular from a winding of the horizontal flyback transformer. Desirably, the same winding may be used to provide the signal for energizing other portions of the receiver such as the filament of kinescope 30. Signal S illustratively exhibits a positive peak (retrace interval) amplitude of approximately +28 volts relative to its 0.0 volt DC reference level, and a negative peak (trace interval) amplitude of approximately −5.0 volts. The negative peak amplitude component of signal S is rectified by diode 56 and filtered by capacitor 57 to produce a negative DC bias voltage of approximately −4.0 volts at the collector of transistor 52. The parallel combination of a bias resistor 51 and a speed-up capacitor 54 is coupled between the base and emitter electrodes of transistor 52.

Transistor 52 is non-conductive at all times except when character information is to be displayed, i.e., when negative-going character information signal C is present. Signal C forward biases transistor 52 into conduction, causing transistor 52 to conduct heavily in a saturated state whereby the emitter potential of transistor 52, and thereby the potential at reference terminal A, closely approximate the negative DC bias potential at the collector of transistor 52. The change in potential at terminal A, from the normal positive reference voltage to the negative voltage developed in response to character signal C, causes the conduction of video signal amplifier transistors 21, 23 and 25 of driver 10 to increase. This in turn causes kinescope 30 to increase conduction significantly and thereby produce a white image display corresponding to the character information represented by signal C.

The described OSD control apparatus including control circuit 50 is advantageous in that the character display is enabled independent of the normal video signal processing path. Thus the intensity of displayed character information is consistent from one receiver to another, and the intensity is independent of the setting of viewer adjustable brightness and contrast controls normally associated with the video signal processing path. In addition, the amount of high level interference signal components with frequencies within the band of video frequencies generated as a result of electronic switching associated with the character display is insignificant. The described OSD control apparatus also exhibits the ability to produce a more intense, e.g., "brighter", character display compared to the OSD system described in the aforementioned Harlan patent. In Harlan a character control signal counterpart of signal C is applied to the base electrode of a grounded collector reference transistor counterpart of transistor 38. The available brightness of a resulting character display is related to the difference in magnitude between the normal output reference voltage (VR), and the modified reference voltage which approximates the grounded collector bias potential of the reference transistor (0.0 volts) when the reference transistor is caused to conduct heavily in a saturated state in response to the character control signal.

In contrast, control circuit 50 in FIG. 1 produces a greater difference in magnitude between the normal and modified reference voltage at terminal A, due to the negative bias potential applied to the collector of transistor 52, whereby a more intense character display is produced. The negative bias potential is advantageously and conveniently derived from a source of pre-existing locally generated flyback signals, and the bias deriving circuit including elements 55, 56 and 57 presents an insignificant load to the deflection signal source. Undesirable signal components such as noise and other forms of spurious signals which may be associated with the signal source from which the bias for transistor 52 is derived, do not affect video signals normally processed by driver stage 10 since control circuit transistor 52 is non-conductive during normal video signal image intervals.

Control circuit 50 can be used with receivers having an active reference voltage source of the type corresponding to circuit 35, and with receivers which do not. If desired, the intensity of a displayed character can be reduced slightly by adding a resistor in series between the emitter of transistor 52 and terminal A.

FIG. 2 illustrates additional aspects of the television receiver in relation to OSD control circuit 50.

Color television signals received by an antenna 110 are applied to a radio frequency (RF) and intermediate frequency (IF) tuning and signal processing unit 120, including RF and IF amplifier and video detector stages. The tuning portion of unit 120 includes a frequency selective channel selector (tuner) mechanism, and a tuner control network. The tuner control network includes means for generating a picture interval blanking control signal (i.e., a "black" signal), not shown, for blanking normal video information signals during OSD intervals, and character display control signal C (i.e., a "white" signal) during OSD intervals.

Detected video signals from unit 120 are separated by a luminance-chrominance separator 130 (e.g., comprising a comb filter) into luminance and chrominance components for processing by units 132 and 134, respectively. Processed color difference signals from unit 134 and the processed luminance component from network 132 are combined in a matrix amplifier 135 to produce the low-level r, g, b color image signals for driver stage 10.

Detected video signals from unit 120 are also supplied to a sync separator 140 for deriving the horizontal (line) and vertical (field) synchronizing components of the television signal. The derived sync components are supplied to sync processing and deflection circuits 142. Circuits 142 provide horizontal and vertical deflection signals H and V for application to deflection control circuits of the kinescope, in addition to horizontal and vertical blanking timing signals. As explained previously in connection with FIG. 1, signal S is derived from horizontal flyback circuits associated with deflection circuits 142. Driver stage 10, driver reference bias source 35 and OSD control circuit 50 are arranged as shown in FIG. 1.

With the exception of OSD control circuit 50, additional aspects of the receiver system of FIG. 2, particularly with respect to the generation of "white" OSD character signal C and the "black" OSD interval video blanking signal, are disclosed in aforementioned U.S. Pat. No. 4,354,202—Harlan, incorporated herein by reference.

What is claimed is:

1. In a video signal processing and display system including a source of image representative video signals; an image display device for providing a picture display during image intervals in response to applied video signals; and a display driver stage with a signal input coupled to said video signal source, a signal output for providing amplified video signals to said display device, and a reference input; apparatus comprising:

a source of reference potential coupled to said reference input of said display driver, said reference potential being a potential to which video signals processed by said driver stage are normally referenced;

a source of auxiliary signal representative of character information to be displayed by said display device during picture intervals; and control means for coupling said auxiliary signal to said reference input of said display driver separate from said source of reference potential; wherein said auxiliary signal when present causes said reference potential at said reference input to be modified such that said driver stage is caused to produce, at said signal output thereof, a signal for causing said display device to display said character information.

2. Apparatus according to claim 1, wherein said control means is rendered conductive in response to said auxiliary signal, and non-conductive in the absence of said auxiliary signal.

3. Apparatus according to claim 2, and further comprising biasing means coupled to said control means for establishing the bias thereof, said bias of said control means being determinative of the intensity of displayed character information.

4. Apparatus according to claim 3, wherein said biasing means derives said bias for said control means from a source of locally generated alternating current signal.

5. Apparatus according to claim 4, wherein said source of locally generated signal is the horizontal deflection circuit of said video signal system.

6. Apparatus according to claim 2, wherein said control means comprises a normally non-conductive active device with an input first electrode coupled to said source of auxiliary signals, an output second electrode coupled to said reference input terminal of said display device, and a third electrode together with said second electrode defining a main current path of said active device; and biasing means coupled to said main current path of said active device for establishing the bias thereof, said bias being determinative of the intensity of displayed character information.

7. Apparatus according to claim 6, wherein said active device is a transistor with base, emitter and collector electrodes corresponding to said first, second and third electrodes.

8. In a video signal processing and display system including a source of image representative video signals; an image display device for providing a picture display during image intervals in response to applied video signals; and a display driver stage with a signal input coupled to said video signal source, a signal output for providing amplified video signals to said display device, and a reference input; apparatus comprising:

a source of auxiliary signal representative of character information to be displayed by said display device during picture intervals;

control means for coupling said auxiliary signal to said reference input of said display driver for causing said driver stage to produce, at said signal output thereof, a character information drive signal for said display device; and biasing means coupled to said control means for establishing the bias thereof, said control means bias being determinative of the intensity of displayed character information procuded in response to said character drive signal; wherein said biasing means derives said control means bias from a source of locally generated synchronizing signal.

9. Apparatus according to claim 8, wherein said source of locally generated signal is the horizontal deflection circuit of said video signal system.

* * * * *